Oct. 26, 1971     J. N. REABEN     3,615,146

COMBINATION TOASTER AND FRYING PAN

Filed Sept. 25, 1967

INVENTOR

James N. Reaben

United States Patent Office 3,615,146
Patented Oct. 26, 1971

3,615,146
COMBINATION TOASTER AND FRYING PAN
James N. Reaben, 4539 Sunburst St.,
Bellaire, Tex. 77401
Filed Sept. 25, 1967, Ser. No. 676,985
Int. Cl. A47j 37/10
U.S. Cl. 99—339
1 Claim

ABSTRACT OF THE DISCLOSURE

A cooking utensil which will permit the frying of bacon, hamburger, eggs, sausage, etc. while toasting bread, buns, frozen waffles, etc. on an elevated surface free from bacon and other grease. The preferred shape is rectangular. The basic design is a depressed cooking area between two flat cooking surfaces. A preferred material is $\frac{1}{16}''$ aluminum alloy.

Figure 1:
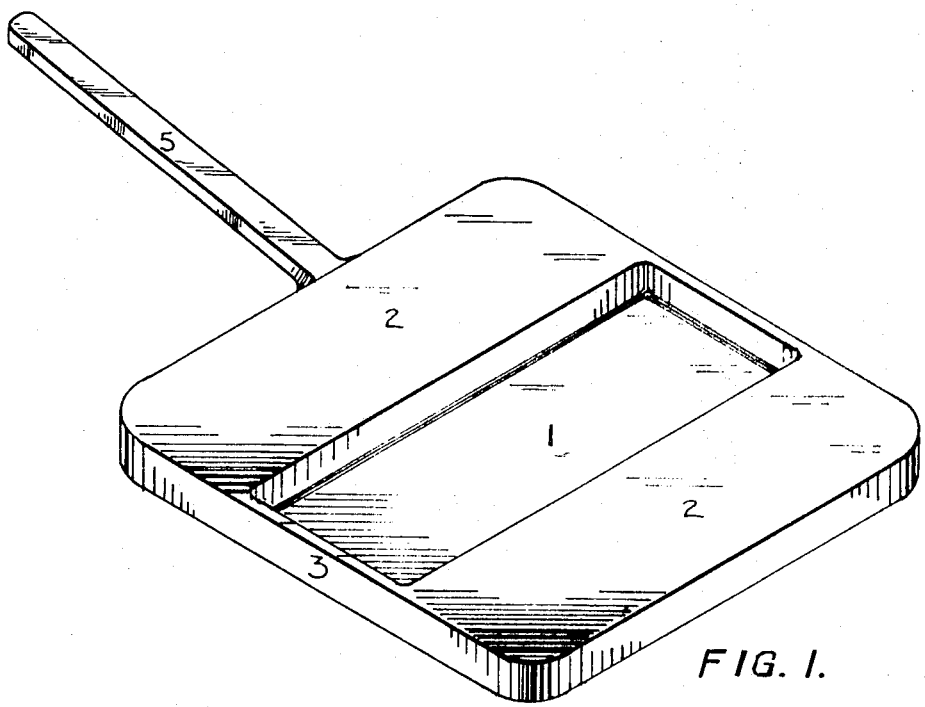
Figure 2:
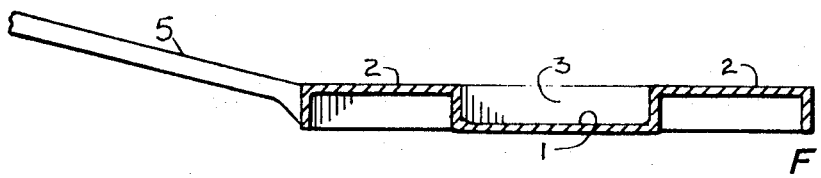

My invention consists of a cooking utensil of rectangular shape having a depressed area between two elevated flats. The depressed area is confined at the ends by two vertical sides flush with the elevated flats. The underside of the elevated flats are substantially hollow. The device can be placed on a single gas burner, a single electric element, a campfire, or a charcoal grill, or can be fitted with integral electric element.

The frying depression designated 1 in the drawings, FIGS. 1, 2, 3, and 4, is about $\frac{5}{8}''$ deep, $3\frac{1}{2}''$ wide and 9" long. The elevated toasting flats, designated 2 are about 3" wide. These dimensions seem to be best suited to uses discussed hereinafter in the claim.

Figure 3:
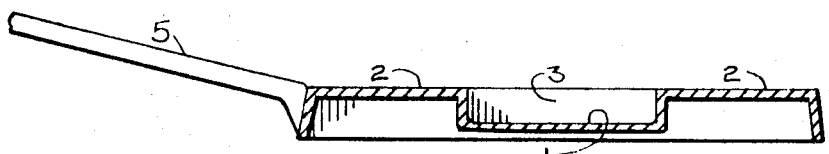
Figure 4:
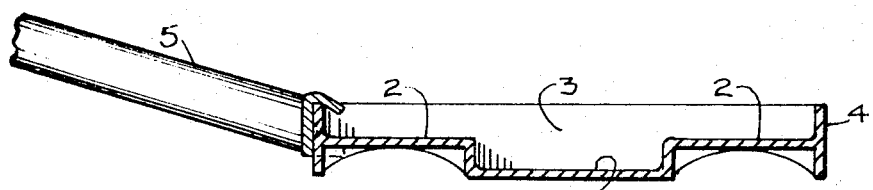

An isometric view of the simplest design is shown as FIG. 1. A section of this same design is designated FIG. 2. Variants are shown as FIGS. 3 and 4. The section FIG. 3, is a variant with an improved appearance at perhaps a slightly extra cost and permitting shapes other than rectangular. Section FIG. 4, variant provides vertical sides on all four sides for broadening uses outdoors, in ovens (designation 4).

Handles designated 5 are shown as typical and general. Integral or attached are both suitable especially one instantly removable as in FIG. 4.

The combination toaster and frying pan can be cast from aluminum alloy or iron, or die-stamped and even fabricated as was the prototype. The surfaces can be treated with silicone or coated with Teflon.

Dry toast can be prepared on the flats, two half-slices per side, or the toast may be brushed with butter or oleo. Same applies to sizes of frozen waffles currently available. Although bacon and eggs will probably be cooked successively, the size of the depressed area will permit simultaneous frying of bacon and egges by cutting bacon in half and frying the two pieces side by side and the egg at the other end; likewise sausage and egg.

Proper distribution of heat when used over a single burner can be assured by use of metal of suitable thickness. The $\frac{1}{16}''$ aluminum alloy in the prototype is adequate.

I claim:
1. The combination of a toaster and frying utensil including a central flat depressed frying area in the center and two flat toasting areas at a higher level free from grease and disposed along opposite sides of the frying area, said depressed frying area being rectangular in shape, and the undersides of the flat toasting areas being substantially hollow for proper heat distribution.

References Cited

UNITED STATES PATENTS

| | | | |
|---|---|---|---|
| 1,469,318 | 10/1923 | Hill | 99—339 UX |
| 1,505,675 | 8/1924 | Stirn | 99—339 |
| 1,936,551 | 11/1933 | Garrison | 99—339 |
| 1,969,184 | 8/1934 | Riley | 99—357 |
| 2,579,258 | 12/1951 | Heckert | 99—330 X |

WALTER A. SCHEEL, Primary Examiner

A. O. HENDERSON, Assistant Examiner

U.S. Cl. X.R.

99—367